(12) United States Patent
Chataing et al.

(10) Patent No.: US 7,469,781 B2
(45) Date of Patent: Dec. 30, 2008

(54) FEEDING OF A PRESSURISED DEVICE WITH VARIABLE GRAIN SIZING SOLID

(75) Inventors: Thierry Chataing, Lars-en-Vercors (FR); Jean-Pierre Grangier, Voiron (FR); Maurice Rostaing, Villes-sous-Anjou (FR); Thomas Koch, Soborg (DK)

(73) Assignees: Commissariat a l'Energie Atomique, Paris (FR); Institut Francais du Petrole, Rueil Malmaison (FR)

( * ) Notice: Subject to any disclaimer, the term of this patent is extended or adjusted under 35 U.S.C. 154(b) by 31 days.

(21) Appl. No.: 10/592,721

(22) PCT Filed: Mar. 14, 2005

(86) PCT No.: PCT/FR2005/050163

§ 371 (c)(1),
(2), (4) Date: Sep. 13, 2006

(87) PCT Pub. No.: WO2005/092749

PCT Pub. Date: Oct. 6, 2005

(65) Prior Publication Data

US 2007/0199801 A1    Aug. 30, 2007

(30) Foreign Application Priority Data

Mar. 15, 2004    (FR) .................................. 04 50517

(51) Int. Cl.
*B65G 33/32*    (2006.01)

(52) U.S. Cl. ...................................... 198/668; 198/662

(58) Field of Classification Search ................. 198/658, 198/662, 669, 666, 668, 550.1, 550.6; 414/217, 414/218
See application file for complete search history.

(56) References Cited

U.S. PATENT DOCUMENTS 2,288,099 A * 6/1942 Mason ..................... 198/550.6
2,536,240 A * 1/1951 Vincent ..................... 198/658

(Continued)

FOREIGN PATENT DOCUMENTS

DE    483 051    9/1929

(Continued)

OTHER PUBLICATIONS

Sydkraft AB: "The Vämamo Demonstration plant report", Berlings Skogs, Trelleborg 2001, (whole document).

*Primary Examiner*—James R Bidwell
(74) *Attorney, Agent, or Firm*—Oblon, Spivak, McClelland, Maier & Neustadt, P.C.

(57) ABSTRACT

A device for conveying inhomogenous solid matter, particularly biomass, includes an endless screw. The endless screw is located in a sleeve fitted with a counter screw, which allows better transportation, and the possible creation of a plug of compressed material at predetermined points on the screw, which isolates the device from the outside. The device can be coupled with at least one other endless screw, which can be put under a pressure greater than the device. The screw erodes the plug and transports the matter so obtained, for example to a pressurized reactor. With the device, a pressure difference between for example a raw material storage tank and a reactor does not lead to excessive cost in terms of pressurizing gas.

25 Claims, 2 Drawing Sheets

U.S. PATENT DOCUMENTS

| | | | |
|---|---|---|---|
| 3,841,465 A * | 10/1974 | Miller et al. | 198/608 |
| 4,668,130 A * | 5/1987 | Sharp | 414/218 |
| 4,726,715 A * | 2/1988 | Steen et al. | 198/662 |
| 4,881,862 A * | 11/1989 | Dick | 414/218 |
| 5,368,153 A * | 11/1994 | Bruke | 198/668 |
| 5,524,796 A | 6/1996 | Hyer | |
| 5,823,123 A | 10/1998 | Waldner | |
| 7,303,597 B2 * | 12/2007 | Sprouse et al. | 48/197 R |

FOREIGN PATENT DOCUMENTS

| | | |
|---|---|---|
| DE | 1 277 144 | 9/1968 |
| DE | 222 091 A1 | 5/1985 |
| GB | 920 138 | 3/1963 |
| JP | 59-173394 | 10/1984 |
| JP | 60-81385 | 5/1985 |
| WO | WO 93/15262 | 8/1993 |

* cited by examiner

FEEDING OF A PRESSURISED DEVICE WITH VARIABLE GRAIN SIZING SOLID

TECHNICAL FIELD

The invention has to do with the transporting of solid matter. More particularly, the invention relates to the transporting of matter which is granular or not homogeneous in form, in other words of variable granulometric composition and more or less mixed with a liquid, of which an example is currently known under the name "biomass".

In particular, the invention has to do with transporting from a first tank or storage place to a second pressurized tank.

PRIOR ART

The term "biomass" includes under one of its uses any inhomogeneous material of biological origin, which can be almost-dry, like sawdust or straw residues, or saturated with water like household waste. Since it is of variable granulometric composition, it can prove difficult to transport. In fact with biomass recovery, such as for example by thermochemical conversion, becoming increasingly topical, if not mandatory, conveying this solid matter is becoming common practice and must meet demanding criteria, like the absence of loss, and must do so under optimum cost conditions.

Many devices for feeding solid exist, including in relation to the biomass. Accepted solutions conventionally use endless screws. But these systems have been developed to operate at pressures in the vicinity of atmospheric pressure.

In fact, during recovery processes like thermochemical conversion, it is necessary, from biomass of different types and granulometric compositions usually stored at atmospheric pressure, to be able to continuously feed a chemical reactor operating under pressure.

A first category of devices designed to operate under these conditions uses intermediate pressurized, chambers with nitrogen for example, which are known by the name "Lock Hopper"; an example of a reactor of this kind is provided by the Värnamo demonstration plant (Sydkraft AB: "The Värnamo demonstration plant report", Berlings Skogs, Trelleborg 2001). The main drawback of such devices lies in the very considerable consumption of pressurizing gas with values conventionally of the order of one tenth of the mass flow being conveyed.

Another category is based on a concept which consists in compressing the biomass by cascaded pistons allowing a good seal between the storage element (conventionally at low pressure) and the reaction element (at high pressure). It is however difficult to maintain compression in the plug while feeding with solid, and instabilities appear in the downstream process, given that feeding with solid is cyclical.

Another solution has been developed where a traditional endless screw is used to compress matter which comes to be held on a turntable fitted with metal peaks the function of which is to erode the plug thus formed. The decomposed plug is collected then conveyed, for example by an endless screw, towards the high-pressure process, as in the documents JP59-173394 or JP60-81385. It turns out however that the manufacture of a plug using a traditional endless screw leads to a reduced rate of compression, therefore a reduction in the seal provided by the plug. Furthermore, the operation is not constant over time, since the continuous passage of solids tends to polish the surface in contact with the plug, thereby causing a reduction in compression efficiency. Modifications to the shape of the endless screw, such as using an endless screw with a variable (DD-A-222091) or conical (WO 93/15262) pitch, do not provide a final solution to these problems.

There is therefore a need to improve the transfer of biomass from a feed tank to a pressurized reactor. To this end, the conveying of solid matter of variable granulometric composition forms part of the elements to be perfected.

DISCLOSURE OF THE INVENTION

According to one of its aspect, the invention relates to a conveying device based on transporting by an endless screw. Under the invention, to avoid problems inherent to blocking the transfer caused for example by a plug of compressed matter, the device according to the invention has a counter screw on the sleeve surrounding the endless screw; the transporting can therefore be effected hermetically, and the counter screw makes it possible to avoid matter accumulating on the walls of the sleeve while guiding the compressed matter.

Preferably, the counter screw has a pitch far larger than the pitch of the conveying screw, and several interwoven counter screws are present. The screw and the counter screw(s) may have a constant pitch or variable pitches, possibly independently of each other.

It is preferable for the angle between the spirals of the screw and the spirals of the counter screws to be equal to 90° to obtain maximum efficiency, particularly in the event of the transported solid being compressed as well as just transported: compression is thus improved and energy consumption is optimised.

From another aspect, the invention relates to a transporting system in which the device presented previously is used between introduction means which can be connected to a first tank, or feeder, and discharge means, which can be connected to a second tank, for example a reactor, which may in particular be pressurized, in other words at a pressure higher than the feed tank, for example by a very substantial temperature difference.

Preferably, the conveying device present in the system compresses the matter in addition to transporting it, through for example the presence of temporary sealing means.

Advantageously the compressed matter, or plug, located at one end of the endless screw of the conveying device, is then eroded so as to be transported once again. To this end, the system according to the invention is able to have a second endless screw, or even a second device similar to the first one, located preferably at right angles to the end of the first conveying device where the plug is found, and at least one of the spirals of which can be manufactured so as to erode the plug to allow the matter thus removed to be transported by the second endless screw. To this end, the means for sealing the first device and allowing the transported matter to be compressed can be constituted by the second endless screw, against which the plug comes to be held.

According to one of the possibilities, the process thus generated can be repeated, and the system may comprise a variable number of endless screws and devices to convey the solid matter. It is desirable for the matter to be conveyed entirely along a horizontal plane (except for feeding). All the endless screws, or only some of them, or even perhaps only the first one, may provide compression parallel to the conveying. In a preferred way, the screws allowing compression are part of devices as described previously, in other words are located in sleeves that have counter screws. The presence of counter screws, as explained above, reduces losses of matter during transportation, allows homogenous compression without clogging up the system, and therefore allows a plug to be generated with predetermined compression rate and seal qualities.

To advantage, the assembly between the successive conveying devices is sealed. The system can even be sealed from the feeder means input to the discharge tank.

From another aspect, the invention relates to a process for conveying matter from a first tank to a second tank, the second tank being able to be pressurized, by means of endless screws associated with counter screws, preferably with compression of the transported matter. Compression is accompanied by the formation of a plug which provides a seal between the device creating the plug and the device located downstream.

The use of successive endless screws allows gradual pressurization, and therefore a reduced use of pressurizing gas, or even the use of several different gases while transporting.

BRIEF DESCRIPTION OF THE DRAWINGS

The figures in the appended drawings will allow the invention to be better understood, but are only given as an example and are in no way restrictive.

DETAILED DISCLOSURE OF PARTICULAR EMBODIMENTS

Figure 1:
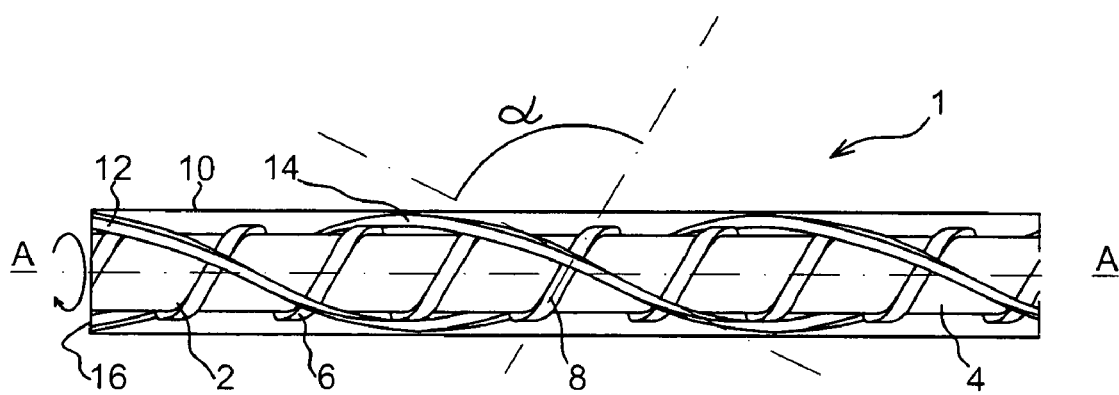
FIG. 1 shows a device according to one of the preferred embodiments of the invention.

FIG. 1 shows a conveying device 1. As in the prior art, this device comprises an endless screw 2, including a shaft 4 rotating around an axis AA and fitted with a projecting helical winding 6. The helical winding 6 has, in a first winding direction, spirals 8 which can be separated according to a variable, but preferably a constant, pitch. The endless screw 2 is located in a sleeve 10 in which it is able to rotate freely.

Conversely and according to the invention, the sleeve 10 has on its inner surface at least one projecting helical winding 12, also called a counter screw or cage screw. In FIG. 1, two counter screws 12 are present, each being composed of spirals 14 wound in a second winding direction opposite to the first winding direction of the endless screw 2. The sleeve 10 and the winding 12 are dimensioned so that the screw 2 is able to rotate freely; the sleeve 10 may itself possibly be subject to a rotation in the same direction as, and at a speed different from, the screw 2, or in the reverse direction. The spirals 14 of the cage screws 12 are spaced out by a variable or constant pitch, preferably each of the counter screws 12 being similar in shape for one and the same device 1. It is desirable for the counter screws 12 to have a much wider pitch than the pitch of the endless screw 2, preferably between 5 and 20 times, for example 10 times wider.

The dimensions of the shaft 4, sleeve 10, projections 8, 14, pitches of the screw 2 and of the counter screw 12, depend on the material to be transported and the required throughput. It is desirable for the spirals 14 to have dimensions substantially identical to those of the spirals 8 of the endless conveying screw 2, in other words for the size of the cross-section of the spirals 8, 14 in a plane perpendicular to their direction to be similar to the counter screw 12 and the endless conveying screw 2. The materials constituting the device 1 may for example be stainless steel, particularly when the device operates at a low or not very high temperature; when the matter is transported for example at more than 1,000° C., nickel or alloys thereof are envisaged. It is also possible for the screw to be constituted by two materials successively, for example with a high temperature resistant alloy, of the Haynes®HR230 type, on the side located at the discharge end.

EXAMPLE 1

One of the embodiments for transporting charcoal involves a device 1 made of stainless steel 304L; a screw 6 the shaft 4 of which has a diameter of 22 mm rotates in a sleeve 10 of internal diameter 40 mm. The spirals 8, 14 of the helical windings are of square side cross-section 4 mm, with a pitch of 30 mm in respect of the screw 6 and 270 mm in respect of the counter screw 12.

EXAMPLE 2

One of the embodiments for transporting charcoal involves a device 1 made of stainless steel 304L; a screw 6 the shaft 4 of which has a diameter of 90 mm rotates in a sleeve 10 of internal diameter 160 mm. The spirals 8, 14 of the helical windings are of square side cross-section 10 mm, with a pitch of 130 mm in respect of the screw 6 and 900 mm in respect of the counter screw 12.

Preferably, and as has been shown in FIG. 1, to obtain maximum efficiency, the counter screw 12 is orientated perpendicular to the endless screw 2, in other words the angle α between the direction of the spirals 8 of the endless screw 2 and the direction of the spirals 14 of the counter screw 12 is constant along the device and equal to 90°. This allows better compression and smaller energy consumption, but depending on the circumstances, other angles are conceivable.

Such a device makes it possible to convey solid matter of variable granulometric composition, and particularly biomass, without clogging, over large distances. Furthermore, the device 1 according to the invention allows the solid matter being transported to be compressed, and a plug to be created: if the "final" end 16 of the endless screw 2, in other words the end towards which the conveyed matter is being directed, is wholly or partially blocked, there occurs an accumulation of matter. Unlike existing devices where this plug can clog up the sleeve 10, the plug created by the device according to the invention will be located at the end 16 of the endless screw 2 thanks to the movement generated by the counter screw 12. The cage screw 12 furthermore makes it possible to increase and homogenise the rate at which the matter is compressed. It is possible, in order to promote the creation of a block of homogeneous compressed matter, to leave a part of the shaft 4 without projections 6 around the discharge end 16, in other words to start the winding 12 at a certain distance that is not nil, but substantially reduced, from the end 16 (shown in FIG. 2).

In the context of transporting matter which is heavily soaked with liquid, for example household waste, it is desirable to provide means for extracting the liquid released during compression, for example an orifice located in proximity to the discharge end 16.

Figure 2A:
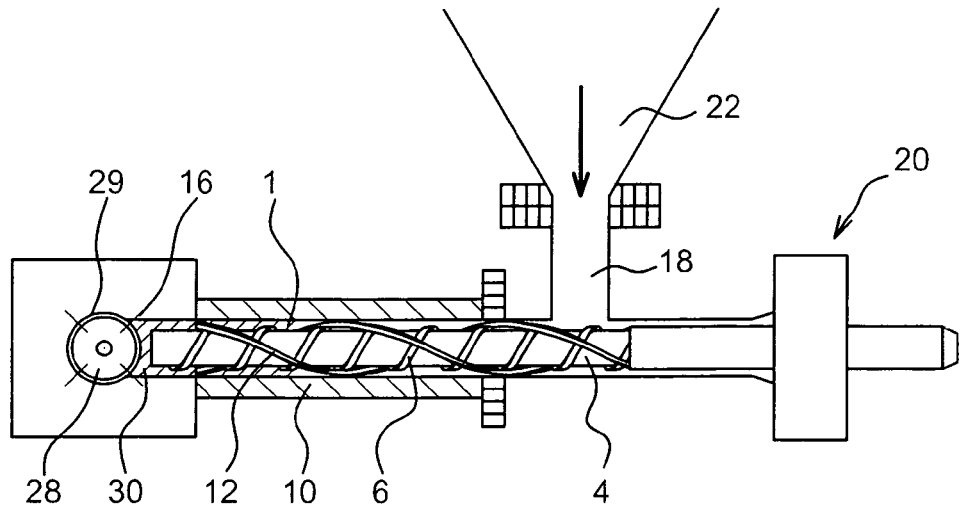
FIGS. 2A and 2B show in diagram form, from the front and from above, a system for transporting biomass, in this context by means of two devices complying with one of the embodiments of the invention.
Figure 2B:
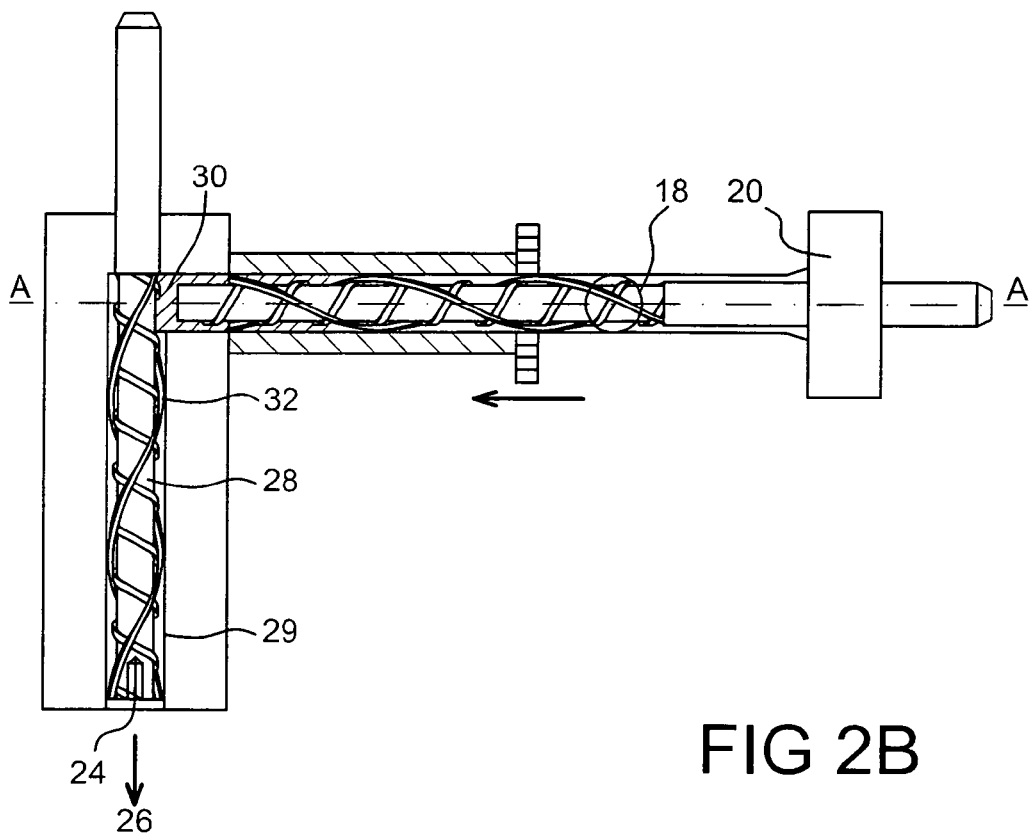

The device 1 may be part of a system, like the one in FIG. 2 in which it is connected to solid matter introduction means 18. These introduction means 18 may be located at the end of the screw opposite to the discharge end 16, or along the winding 6. Preferably, the shaft 4 of the endless screw 2 of the device 1 is extended beyond the introduction means 18 so as to be able to be connected to means 20 for rotating the screw 2.

The introduction means 18 are coupled to a feed tank 22, which operates preferably between atmospheric pressure and several atmospheres. Likewise, the temperature of the feed tank may vary, but preferably remains between the ambient temperature and the thermal decomposition temperature of the relevant product (i.e. between 20° C. and 200° C.).

Furthermore, the discharge end 16 of the device 1 is connected to discharge means 24, which are preferably connected to a discharge tank 26. The connection may be direct, in other words the matter conveyed by the device 1 is directed straight into a storage tank 26. However, where the biomass is compressed by the device 1, or if the discharge tank 26 is at a higher pressure than the pressure prevailing at the level of the feed means 18, or even if the difference in temperature between the two tanks 22, 26 is extreme, it is preferable to place at least one second conveying device between the discharge end 16 of the first device 1 and the discharge means 24 of the system.

To advantage, the second conveying device includes a second endless screw 28; the second screw may also be located in a sleeve 29 in which it rotates freely. Preferably, this second endless screw 28 is configured so as to itself partially seal the discharge end 16 of the first device 10: a plug 30 is created then directly by transporting the matter and bringing it into contact with the screw 28. Preferably, the second endless screw is capable of "nibbling away at", or eroding, the plug 30 created at the end of the device 1. This makes it possible to correctly proportion the biomass fed into the second conveying device 28, 29.

Furthermore, the presence of a plug 30 of compressed matter with a sufficient compression rate allows a seal between the two ends of the plug 30, in other words the end which is directed towards the material input and the end 16 which is eroded by the second conveying device 28: the plug 30 may be sufficiently compact to avoid transfers of pressure between the first device 1 and the second device 28, 29 if the difference in pressure prevailing between the two devices is not too high. To this end, it is desirable for the endless screw of the second device 28 to be placed at an angle of 90° to the axis AA of the first device, as shown in FIG. 2; it is also recommended for the two screws 2, 28 to be located in the same horizontal plane.

It will be noted that depending on the nature and granulometric composition of the material being transported, the rotation speed of the second screw 28, the pitch of its spirals, the rotation speed of the first device 1 and the characteristics relative to the winding thereof 6, it is possible to adjust the rate of compression of the plug 30, and to adapt it to the conditions of any use in a thermo-chemical reactor. Furthermore, it is possible to set a pressure differential between the two devices 28, 29 and 1, and therefore to direct the solid matter towards a discharge tank 26 maintained at a pressure above the feed tank 22. It should be noted that, thanks to the process described above, pressurizing the transported matter does not require, as much pressurizing gas as existing systems, since the seal between the second device 28, 29 and the first tank 22 (through the introduction means 18) can be continuously maintained by the plug 30.

During testing, the pressure loss through the plug, in other words the pressure differential between the sleeve 10 and for example the sleeve 29 of a device located on the other side, was measured with a constant flow of injected gas (nitrogen in this case) for a plug (in this case charcoal), as a function of the resisting torque of the compression screw (the plug therefore had different compression rates). The results are satisfactory, particularly with regard to feeding a pressurized fluid bed with biomass. Furthermore, it was noted that for a pressure loss of 0.2 bars, the loss of pressurizing gas is minimal, with a pressurizing gas flow rate of the order of 1% of the flow of matter processed and transported by the device 1, compared with 10% for systems currently in use.

Means of rotating the second screw 28 may be provided. It is possible to equip the second device 28, 29 also with a counter screw 32, in other words to use as a second conveying device a device similar to the first one, but in respect of which the materials constituting the screws are different. Table I shows characteristics for transporting charcoal.

TABLE I

Examples of technical characteristics for a device in accordance with FIG. 2.

| Part | Material | Flow | 1 kg/h | 100 kg/h |
|---|---|---|---|---|
| Shaft 4 | Stainless steel 304L | Diameter | 22 mm | 90 mm |
| Spiral 6 | Stainless steel 304L | Pitch | 30 mm | 130 mm |
| | | Cross-Section | 4 × 4 mm | 10 × 10 mm |
| Sleeve 10 | Stainless steel 304L | Internal diameter | 40 mm | 160 mm |
| Counter screw 12 | Stainless steel 304L | Pitch | 270 mm | 900 mm |
| | | Cross-Section | 4 × 4 mm | 10 × 10 mm |
| Tank 18 | Stainless steel 304L | | | |
| Shaft 28 | | Diameter | 22 mm | 95 mm |
| | Stainless steel 304L | Length 1 | 1135 mm | 2000 mm |
| | Haynes ® HR230 | Length 2 | 1035 mm | 1000 mm |
| Sleeve 29 | Stainless steel 304L | Internal diameter | 40 mm | 160 mm |
| | | Thickness | 4 mm | 15 mm |
| Counterscrew 32 | | Cross-Section | 4 × 4 mm | 10 × 10 mm |
| | Stainless steel 304L | Length 1 | 1135 mm | 2000 mm |
| | Haynes ® HR230 | Length 2 | 1035 mm | 1000 mm |
| Discharge 26 | Haynes ® HR230 | | | |

In this case when a cage screw is present, it is possible to envisage a second compression of the transported matter: the second device 28, 29 erodes the plug 30 then, similarly to the previous description, transports it in order to form a second plug at its discharge end (not shown). It is then possible to provide a third endless screw at this discharge end to erode the second plug and transport the resulting matter. This principle can of course be repeated, with a number $N \geq 3$ of endless screws, and with the formation of $n \leq N$ plugs, if possible all located in the same horizontal plane. This allows a gradual compression and may be useful in restricting the consumption of pressurizing gas in the event of a large pressure difference between the feed tank 22 and the discharge tank 26.

Furthermore, it is conceivable to use different pressurizing gases in each of the conveying and compression devices. It is also possible to neutralise the matter at an intermediate stage, for example by injecting a neutral gas, or by changing, particularly lowering, the temperature prevailing in the device for one of the stages.

The process and system according to the invention for feeding a pressurized tank with biomass stored in a low pressure tank therefore allow a much reduced consumption of pressurizing gas and in some cases the absence thereof (operating pressure of less than a few bars). The leakage rate between the biomass storage tank and the chemical reactor may remain at a value below one hundredth of the conveyed solid flow (as mass flow).

Furthermore, the discharge tank can be continuously fed with biomass. It is possible to correctly proportion the feed flow for all operating conditions, by using an automatic control of the compression system, to ensure that the system is sealed. It is possible to transport any granular solid, other than biomass, including granules that vary in shape and size. To this end, the endless screws used in the system described above can be adapted, for example by modifying their pitch and the size of their cross-section. Furthermore, the system may operate at an extensive temperature range and can therefore be used for example with cooling for matter that degrades with temperature, or for a chemical reactor that operates at very high temperatures relative to the feed (for example of the order of 1,000° C.).

The invention claimed is:

1. A system for conveying solid from a first tank to a second tank comprising:
    an introduction device which can be connected to the first tank;
    a first conveying device connected to the introduction device, comprising a first endless screw including a shaft fitted with a projecting helical winding in a first winding direction, and a sleeve in which the first screw is located and is configured to rotate, the sleeve including at least one counter screw including a projecting helical winding on an inner surface of the sleeve and in a second winding direction opposite to the first winding direction;
    a second conveying device comprising a second endless screw having an axis perpendicular to the shaft of the first endless screw of the first device, and which comprises a helical winding of spirals at least one of which is able to abrade compressed matter; and
    a discharge device which can be connected to the second tank and which is put into relation with the second device.

2. A system according to claim 1, wherein the sleeve comprises a plurality of counter screws.

3. A system according to claim 1, wherein a pitch of the first endless screw of the first device is constant.

4. A system according to claim 3, wherein each counter screw has a constant pitch.

5. A system according to claim 1, wherein each counter screw has a pitch at least equal to five times the pitch of the first endless screw.

6. A system according to claim 1, wherein a direction of the spirals of the helical winding of at least one counter screw makes an angle of about 90° with direction of the spirals of the helical winding of the screw.

7. A system according to claim 1, comprising the second tank which is pressurized and connected to the discharge device.

8. A system according to claim 1, wherein the second endless screw of the second device comprises a sleeve in which it is able to rotate.

9. A system according to claim 7, wherein the second device is similar to the first device.

10. A system according to claim 8, wherein the sleeve of the second device is hermetically sealed with the sleeve of the first device at the end of the first endless screw opposite to the introduction device.

11. A system according to claim 9, comprising a plurality of second devices.

12. A system according to claim 11, wherein each device is sealed in a leakproof way with the device preceding it in the conveying direction at a right angle.

13. A process for conveying a solid material from a first feed tank to a second reaction tank by a system according to claim 1, comprising:
    creating a plug of solid material compressed by the first device and transporting of the solid material to the second tank.

14. A process according to claim 13, comprising plural formations of plugs of solid matter and abrasions by conveying devices.

15. A process according to claim 13, wherein the second tank is at a higher pressure than the first tank.

16. A system according to claim 1, wherein said sleeve is subject to a rotation in a same direction as, and at a speed different from, the first endless screw.

17. A system according to claim 1, wherein said projecting helical winding on the shaft and said projecting helical winding on an inner surface of the sleeve each extend beyond said introduction device so as to end between said introduction device and a rotation device that rotates said first endless screw.

18. A system according to claim 1, wherein said second endless screw of said second device includes a central shaft, and wherein said second endless screw and said first device are positioned against each other so that said first endless screw compresses material against said second endless screw and said second device partially seals a first discharge end located at an end of said first device with a plug of compressed material at said first discharge end, and wherein said second endless screw of said second device erodes said plug of material and transports eroded material from said first discharge end to a second discharge end located at an end of said second device.

19. A system according to claim 18, wherein said second endless screw and said first device are configured with respect to each other so that said plug of compressed material is sufficiently compact to maintain a pressure differential between the first and second devices.

20. A system according to claim 1, wherein said first and second devices are located in a same horizontal plane.

21. A system for conveying solid from a first tank to a second tank comprising:
    an introduction device which can be connected to the first tank;
    a first conveying device connected to the introduction device, comprising a first endless screw including a shaft fitted with a projecting helical winding in a first winding direction and having a first constant pitch, and a sleeve in which the first screw is located and is configured to rotate, the sleeve comprising at least one counter screw including a projecting helical winding on an inner surface of the sleeve and in a second winding direction opposite to the first winding direction and having a second pitch at least equal to five times the first pitch;

a second conveying device comprising a second endless screw having an axis perpendicular to the shaft of the first endless screw of the first device, and which comprises a helical winding of spirals at least one of which is able to abrade compressed matter, and a sleeve in which the second screw is located and is able to rotate;

a discharge device which are put into relation with the second device; and the second tank which is pressurized and connected to the discharge device.

22. A system according to claim 21, wherein the sleeve of the second device is hermetically sealed with the sleeve of the first device at the end of the first endless screw opposite to the introduction device.

23. A system according to claim 22, wherein a direction of spirals of the helical winding of the at least one counter screw makes an angle of about 90° with direction of the spirals of the helical winding of the first screw.

24. A system according to claim 22, comprising a plurality of second devices.

25. A system according to claim 24, wherein each device is sealed in a leakproof way with the device preceding it in the conveying direction at a right angle.

* * * * *